United States Patent [19]

Nishino

[11] Patent Number: 5,459,460

[45] Date of Patent: Oct. 17, 1995

[54] COLLISION WARNING SYSTEM

[75] Inventor: Jun Nishino, Omiya, Japan

[73] Assignee: Kansei Corporation, Omiya, Japan

[21] Appl. No.: 76,633

[22] Filed: Jun. 15, 1993

[30] Foreign Application Priority Data

Dec. 11, 1992 [JP] Japan .................................. 4-352397
Dec. 11, 1992 [JP] Japan .................................. 4-352399

[51] Int. Cl.$^6$ ...................................................... G08G 1/16
[52] U.S. Cl. ............................ 340/963; 340/435; 364/461
[58] Field of Search ............................ 340/903, 438,
340/436, 435; 364/424.01, 424.04, 461;
180/170

[56] References Cited

U.S. PATENT DOCUMENTS 4,543,577 9/1985 Tachibana et al. ....................... 340/904
5,189,619 2/1993 Adachi et al. ....................... 364/426.04

FOREIGN PATENT DOCUMENTS

3222900C2 3/1983 Germany .
3438632C2 5/1985 Germany .
3622447C1 7/1986 Germany .
4005444A1 8/1991 Germany .
1-152282 10/1989 Japan .
2-043746 3/1990 Japan .

*Primary Examiner*—Jeffery A. Hofsass
*Attorney, Agent, or Firm*—Foley & Lardner

[57] ABSTRACT

A collision warning system is mounted on a vehicle to issue an alarm when the vehicle approaches near an obstacle running in front of the vehicle. The system detects a speed (Vf) of the vehicle; a distance (R) between the vehicle and the obstacle; a speed (Va) of the obstacle using both the speed (Vf) of the vehicle and the distance (R). The collision warning system issues an alarm to a driver if the following relationship exists between the vehicle and the obstacle:

$$Vf \times Td + (Vf - Va)^2/2\alpha \geq R$$

wherein:
Td: a fixed time period, and
α: a braking performance of the vehicle.

8 Claims, 7 Drawing Sheets

B REFLECTED SIGNAL FROM OBSTACLE

A REFLECTED SIGNAL FROM ADJACENT ROAD SURFACE

DISTANCE BETWEEN VEHICLE AND OBSTACLE 5,459,460

COLLISION WARNING SYSTEM

BACKGROUND OF THE INVENTION

1. Field of the Invention

The present invention relates in general to collision warning systems and more particularly to collision warning systems of a type which is mounted on a motor vehicle issue an alarm when the vehicle approaches near an obstacle (viz., front vehicle) running in front of the motor vehicle.

2. Description of the Prior Art

In order to clarify the task of the present invention, one collision warning system of the above-mentioned type will be described with reference to FIGS. 5, 6 and 7 of the accompanying drawings.

For ease of understanding, in the following description, the vehicle on which the collision warning system is mounted will be referred to as a rear vehicle, and an obstacle (viz., another vehicle) which is running in front of the rear vehicle will be referred to as a front vehicle.

In FIG. 5, denoted by numeral 1 is a distance detection part which, by using laser beams emitted from laser diodes (which will be referred to as "LD" for ease of description), detects the distance (which will be referred to as "vehicle-to-obstacle distance" hereinafter) between the rear vehicle and the obstacle (viz., the front vehicle) in front of the rear vehicle. Denoted by numeral 2 is a running condition detection part which detects the running condition of the rear vehicle.

Denoted by numeral 3 is a signal processing part which processes information signals issued from the distance detection part 1 and the running condition detection part 2. That is, upon receiving an instruction signal from the signal processing part 3, the distance detection part 1 issues information signals which represent the vehicle-to-obstacle distance. By analyzing the information signals of the vehicle-to-obstacle distance and information signals representing the vehicle running condition which are issued from the running condition detecting part 2, the signal processing part 3 derives a relative speed between the rear vehicle and the obstacle for judging whether the obstacle is stationary or moving. Furthermore, by analyzing the vehicle speed, the relative speed, a personal equation of the driver in braking the vehicle and so on, the signal processing part 3 judges whether or not the rear vehicle has a possibility of collision against the obstacle.

Designated by numeral 4 is a display and alarm issuing part which, based on the processed data from the signal processing part 3, displays the vehicle-to-obstacle distance and issues an audible and/or visual alarm when the possibility of vehicle collision is determined by the signal processing part 3.

The running condition detection part 2 includes a vehicle speed sensor 31. The signal processing part 3 includes an arithmetic circuit 41 and a distance determining switch 42. Information signals issued by the vehicle speed sensor 31 are fed to the arithmetic circuit 41, and when a vehicle speed derived by analyzing the signals from the vehicle speed sensor 31 exceeds 35 km/h, the arithmetic circuit 41 issues an instruction signal to the distance detection part 1.

The instruction signal from the arithmetic circuit 41 is received by a drive signal generating circuit 11 of the distance detection part 1. Upon receiving the instruction signal, the drive signal generating circuit 11 feeds an LD switch driver 12 with an LD energizing signal which is shown in FIG. 6(a) Upon receiving the energizing signal, the LD switch driver 12 issues three types of signals which are shown in FIGS. 6(b), 6(c) and 6(d). With this, three laser diodes LD-L, LD-C and LD-R which are light emitting means of an LD array 13 are energized to emit light (viz., laser beam) having a constant intensity one after another.

The laser beams generated by these three laser diodes LD-L, LD-C and LD-R are projected through a common lens 14 forward but slightly leftward, centrally forward and forward but slightly rightward from the vehicle, respectively. Thus, the laser beam from the laser diode LD-C can be used for detecting the front vehicle which is running in front of the rear vehicle, while, the laser beam from the laser diode LD-L or LD-R can be used for detecting another front vehicle which is running into the lane of the rear vehicle from a left or right side.

The laser beam reflected by the front vehicle is collected by a collecting lens 15 and received by photo diodes 16 (PD). Upon receiving the reflected laser beam, the photo diodes 16 issue corresponding signal to an amplifying circuit 17. By amplifying the signal, the amplifying circuit 17 issues a signal as shown in FIG. 6(e). However, practically, the signal received by the amplifying circuit 17 includes object signals B reflected by the front vehicle and noise signals A reflected by adjacent road surfaces.

Designated by numeral 18 is a threshold determining circuit which, upon receiving the LD energizing signal (viz., the signal shown by FIG. 6(a)) outputted by the drive signal generating circuit 11, generates a threshold signal, as shown in FIG. 6(f), which is fed to a comparator 19. By comparing the level of the signal (viz., the signal shown by FIG. 6(e)) from the amplifying circuit 17 with that of the threshold signal of FIG. 6(f), the comparator outputs only a signal based on the object signal reflected by the front vehicle, which signal is shown in FIG. 6(g).

Designated by numeral 20 is a counter which, upon receiving the LD energizing signal (FIG. 6(a)), starts counting of clock pulses fed by a reference pulse generating circuit 21, and, upon receiving the pulse signal of FIG. 6(g), stops the counting. From the time counted up by the counter 20, an information signal representing the distance between the vehicle and the front vehicle is derived and the signal is fed to the arithmetic circuit 41.

Receiving various information signals from the counter 20 and the vehicle speed sensor 31, the arithmetic circuit 41 carries out a judgement as to whether or not the rear vehicle has a possibility of collision against the front vehicle.

In the arithmetic circuit 41, programmed operation steps shown in the flowchart of FIG. 7 are carried out.

That is, upon energization of the collision warning system, the operation steps start. Then at step 11, the information signal representing a vehicle-to-obstacle distance "R" between the rear vehicle and the front vehicle and the information signal representing the running speed "$V_f$" of the rear vehicle are read. This reading is carried out every given period.

At step 12, the signal representing the vehicle-to-obstacle distance "R" is converted to a display signal which is fed to a distance display device 51 (see FIG. 5). This device 51 displays the distance "R" thereon. Then at step 13, a relative speed [(d/dt)R] between the rear vehicle and the front vehicle and the running speed ($V_a$) of the front vehicle are derived. That is, the relative speed is provided by differentiating the vehicle-to-obstacle distance "R" with an aid of the method of least square or the like. Furthermore, the speed ($V_a$) of the front vehicle is provided by treating the speed ($V_f$) and the relative speed [(d/dt)R].

When the value [(d/dt)R] is smaller than 0 (zero), it is judged that the vehicle-to-obstacle distance "R" is reducing, and, when the value [(d/dt)R] is greater than 0 (zero), it is judged that the vehicle-to-obstacle distance "R" is increasing. While, when the value [(d/dt)R] is 0(zero), it is judged that the vehicle-to-obstacle distance "R" is kept unchanged.

In order to carry out the judgement as to whether the rear vehicle has a possibility of collision against the front vehicle, the following method is employed.

That is, in case wherein the speed of the rear vehicle is represented by "$V_f$"(m/s), the speed of the front vehicle is represented by "$V_a$"(m/s), the braking performance of the rear vehicle is represented by "$\alpha$" (m/s$^2$), and the time (which is set by the distance determining switch 42) elapsed from the time when the driver notices a danger (viz., alarm) to the time when he or she practically actuates the brake pedal is represented by "Td", the following equation is provided for deriving a so-called critical vehicle-to-obstacle distance "Rc" which is used for judging possibility of the collision.

$$Rc = V_f \times T_d + (V_f^2 - V_a^2)/2\alpha \qquad (1)$$

wherein:

$V_f \times T_d$: distance traveled by the rear vehicle during the time "Td", $V_f^2/2\alpha$: stopping distance of rear vehicle, and $V_a^2/2\alpha$: stopping distance of front vehicle.

Then, at step 14, a comparison between the relative speed (d/dt)R and the speed $V_f$ of the rear vehicle is carried out. If, at this step, an equation "$-(d/dt)R = V_f$" is established, that is, when the front vehicle is kept stopping (viz., $V_a = 0$), the operation flow goes to step 15. At this step, by using the following equation, a judgement is carried out for determining the possibility of collision against the stopping front vehicle.

$$V_f \times T_d + V_f^2/2\alpha \geq R \qquad (2)$$

If YES at step 15, that is, if the measured distance between the rear and front vehicles is equal to or smaller than the value "$V_f \times T_d + Vf^2/2\alpha$", the operation flow goes to step 18 judging actualization of possibility of the vehicle collision. At this step 18, an instruction signal is fed to an alarm issuing device 52 (see FIG. 5) to energize the same for letting the driver know the danger. Upon noticing the alarm, the driver can actuate the brake pedal for reducing the speed of the vehicle or stopping the same.

While, if NO at step 14, that is, if the equation "$-(d/dt)R = V_f$" is not established, that is, if the front vehicle is running, the operation flow goes to step 16. At this step, a judgement is carried out as to whether the relative speed [(d/dt)R] is equal to or greater than a predetermined speed "C" (m/s) or not.

If YES at step 16, that is, if the equation "(d/dt)R ≥ C" is established due to a higher relative speed, the operation flow goes to step 15 considering that the rear vehicle is rapidly getting near the front vehicle. That is, in this condition, due to the higher relative speed, the speed of the front vehicle is considered to 0 (zero). Thus, thereafter, the judgement as to issuance of the emergency alarm depends on the equation (2), which has been described hereinafore.

If NO at step 16, that is, if the equation "(d/dt)R ≥ C" is not established due to a lower relative speed, the operation flow goes to step 17 considering that the rear vehicle is following the front vehicle keeping a constant distance therebetween. That is, in this condition, the speed "$V_a$" of the front vehicle is considered substantially equal to the speed "$V_f$" of the rear vehicle. Thus, the equation (1) can be converted to the following equation.

$$Rc = V_f \times T_d \qquad (3)$$

At step 17, the judgement of possibility of collision is carried out by using the following equation (4).

$$V_f \times T_d \geq R \qquad (4)$$

That is, if YES, that is, if the measured distance between the rear and front vehicles is equal to or smaller than the value "$V_f \times T_d$", the operation flow goes to step 18 to issue the emergency alarm.

However, due to its inherent construction, the above-described conventional collision warning system has the following drawbacks.

That is, usage of the equation (1) (or (2)) as means for judging possibility of vehicle collision induces unsuited alarming operation when the vehicle (rear vehicle) is moving at high speed on an expressway or the like. In fact, in a case wherein both the front and rear vehicles are running at high speed, the value "$(V_f^2 - V_a^2)/2\alpha$" of the equation (1) largely affects the value "Rc" even if the speed difference $(V_f - V_a)$ between the rear and front vehicles is small, which causes an extremely large value of the critical vehicle-to-obstacle distance "Rc". Thus, in high speed cruising of the vehicle, the emergency alarm fails to be issued in a desired manner.

Furthermore, usage of the equation (1) (or (2)) for judging the possibility of vehicle collision tends to bring about an unnecessary alarm. In fact, such emergency alarm is sometimes issued even when a sufficiently long distance is left between the rear vehicle and the front vehicle. That is, because the time "$T_d$" is a fixed value set by the distance determining switch 42, the value "$V_f \times T_d$" is proportionally increased with increase of the speed "$V_f$" of the rear vehicle, which increases the critical vehicle-to-obstacle distance "Rc". Thus, even when the driver is just ready for effectively braking the vehicle with his or her foot kept on the brake pedal under cruising of the vehicle, an alarm tends to be issued irrespective of a sufficiently long distance kept between the front and rear vehicles.

SUMMARY OF THE INVENTION

It is therefore an object of the present invention to provide a collision warning system which is free of the above-mentioned drawbacks.

According to the present invention, there is provided a collision warning system which can give a well-timed alarm to a driver even when the vehicle (viz., rear vehicle) is under high speed cruising on an expressway or the like.

According to the present invention, there is further provided a collision warning system in which the standard of judgement of the vehicle collision possibility depends on whether the brake pedal is kept depressed or not.

In accordance with a first aspect of the present invention, there is provided a collision warning system which is mounted on a vehicle to issue an alarm when the vehicle approaches near to an obstacle running in front of the vehicle. The system comprises means for detecting a speed ($V_f$) of the vehicle; means for measuring a distance (R) between the vehicle and the obstacle; means for deriving the speed ($V_a$) of the obstacle by treating both the speed ($V_f$) and the distance (R); means for carrying out an equation which is represented by:

$$V_f \times T_d + (V_f - V_a)^2 / 2\alpha \geq R \tag{A}$$

wherein:

$T_d$: fixed time period,
$\alpha$: braking performance of the vehicle;

and means for issuing an alarm when the equation (A) is established.

In accordance with a second aspect of the present invention, there is provided a collision warning system which is mounted on a vehicle to issue an alarm when the vehicle approaches near to an obstacle running in front of the vehicle. The system comprises means for determining a time period ($T_d$) which is elapsed from the time when a driver notices a danger to the time when he or she practically actuates a brake pedal of the vehicle; means for detecting the speed ($V_f$) of the vehicle; laser beam emitting means for measuring a distance (R) between the vehicle and the obstacle; means for carrying out an equation which is represented by:

$$V_a = V_f - dR/dt \tag{B}$$

means for carrying out an equation which is represented by:

$$V_f \times T_d + (V_f - V_a)^2 / 2\alpha \geq R \tag{A}$$

wherein:

$\alpha$: braking performance of the vehicle;

and alarm means for giving an alarm when the equation (A) is established.

In accordance with a third aspect of the present invention, there is provided a collision warning system which is mounted on a vehicle to issue an alarm when the vehicle approaches near to an obstacle running in front of the vehicle. The system comprises first means for determining a time period ($T_d$) which is elapsed from the time when a driver notices a danger to the time when he or she practically actuates a brake pedal of the vehicle; second means for detecting the speed ($V_f$) of the vehicle; third means for measuring a distance (R) between the vehicle and the obstacle; fourth means for carrying out an equation which is represented by:

$$V_a = V_f - dR/dt \tag{B}$$

fifth means for carrying out an equation which is represented by:

$$V_f \times T_d + (V_f - V_a)^2 / 2\alpha \geq R \tag{A}$$

wherein:

$\alpha$: braking performance of the vehicle;

sixth means for giving an alarm when the equation (A) is established; and seventh means for determining the time period ($T_d$) to 0 (zero) when the brake pedal has been somewhat depressed before the fifth means carries out the equation (A).

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described with reference to the drawings.

Figure 1:
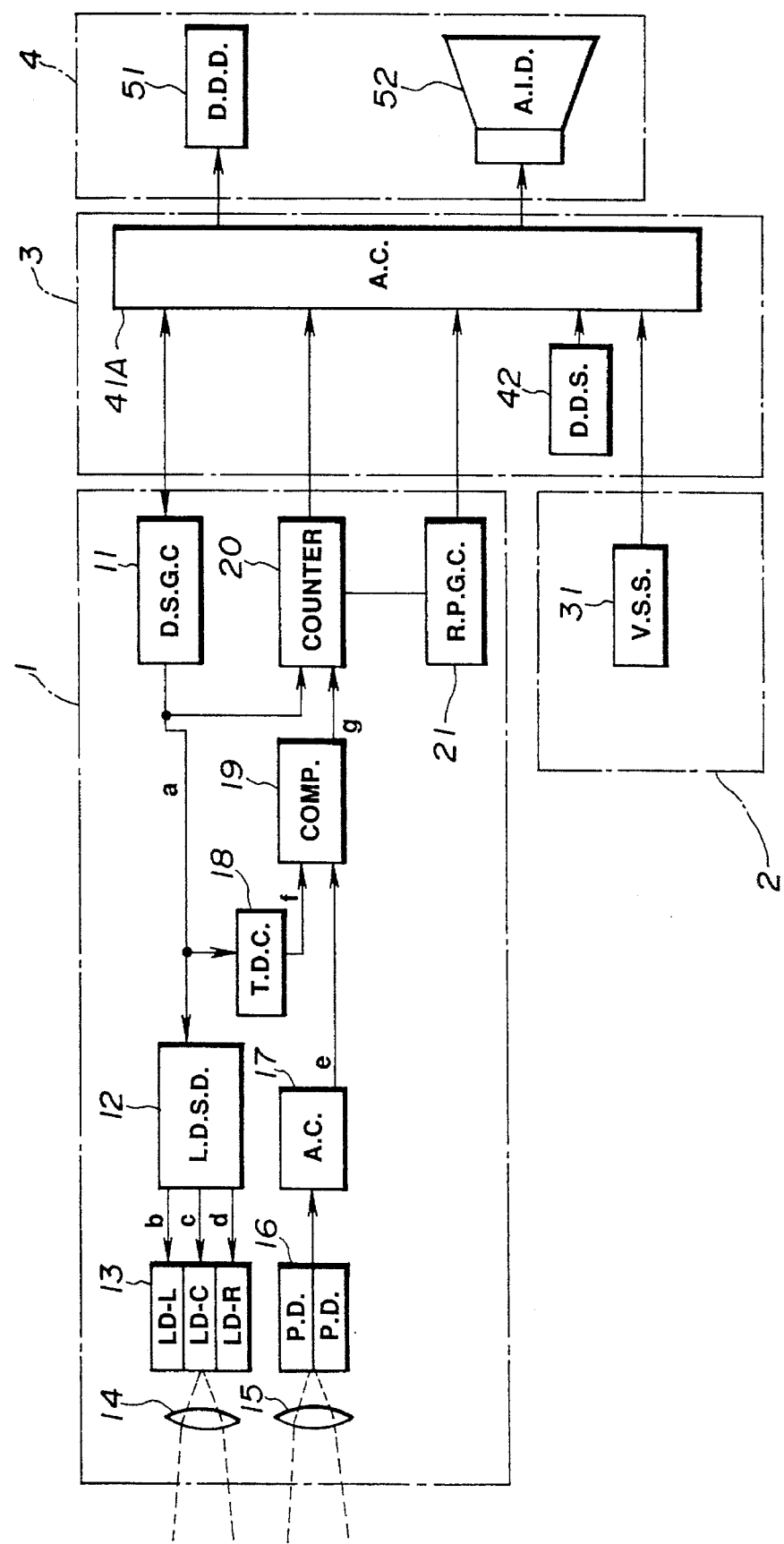
FIG. 1 is a schematic block diagram of a collision warning system which is a first embodiment of the present invention.

Referring to FIG. 1, there is shown a first embodiment of the present invention.

Figure 5:
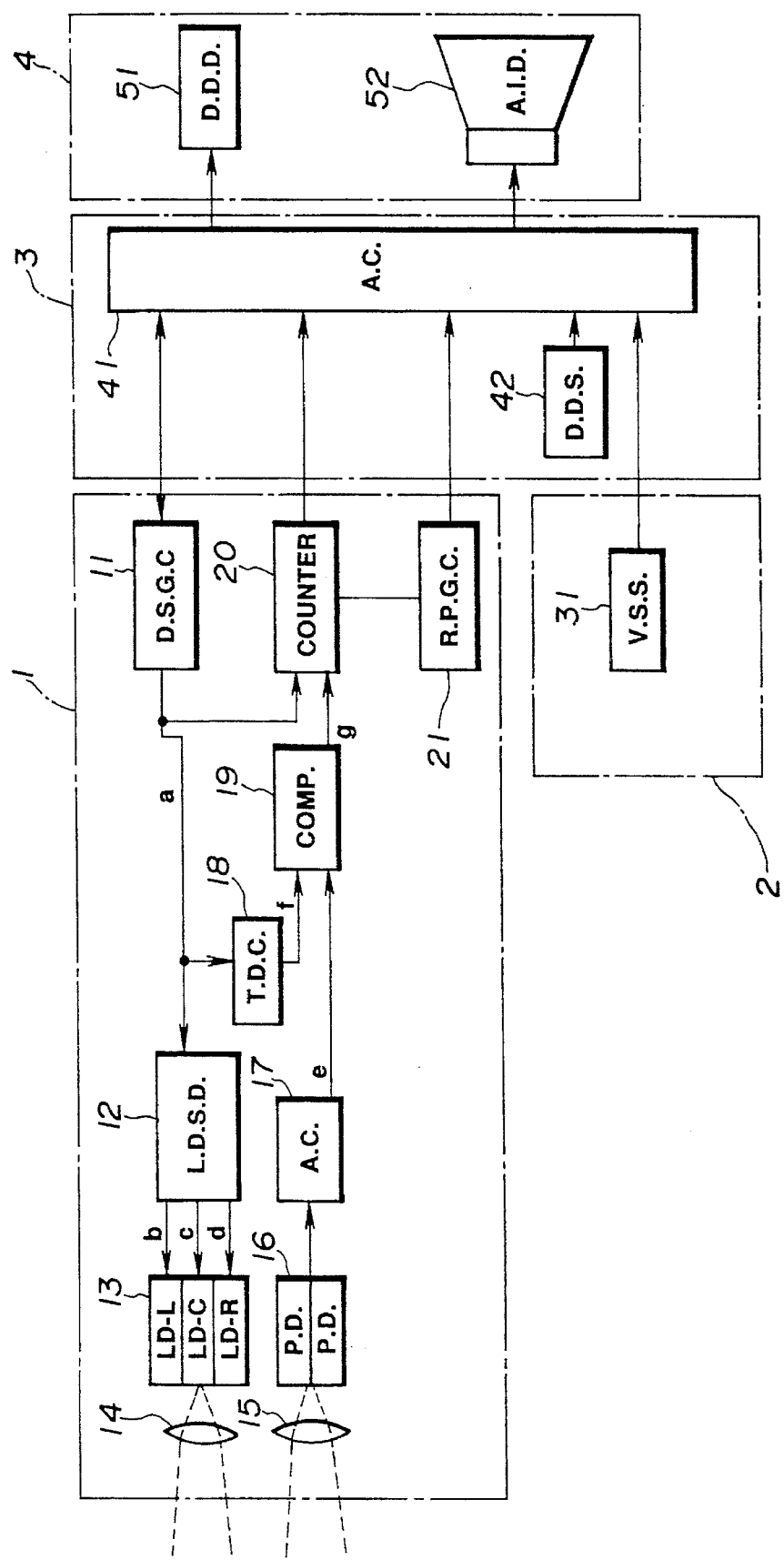
FIG. 5 is a view similar to FIG. 1, but showing a conventional collision warning system.
Figure 6:
FIGS. 6(a)–6(h) are timing charts showing various signals produced or treated in a distance detection part of the conventional system of FIG. 5.
Figure 6:
Figure 6:
Figure 6:
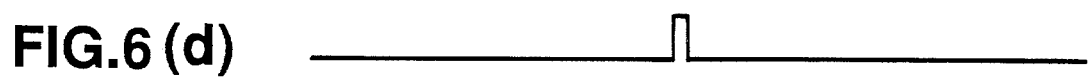
Figure 6:
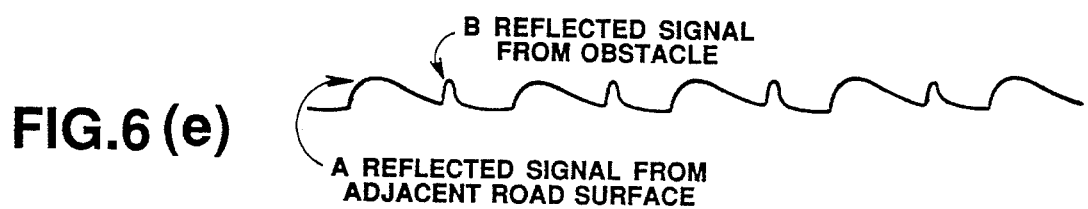
Figure 6:
Figure 6:
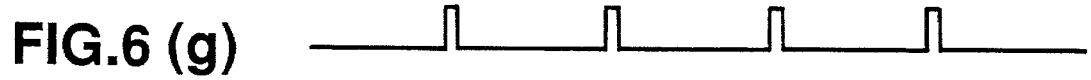
Figure 6:
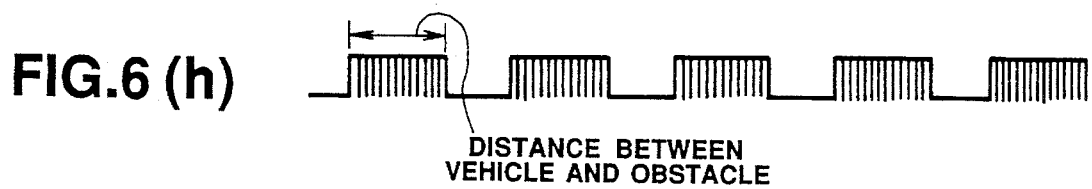
Figure 7:
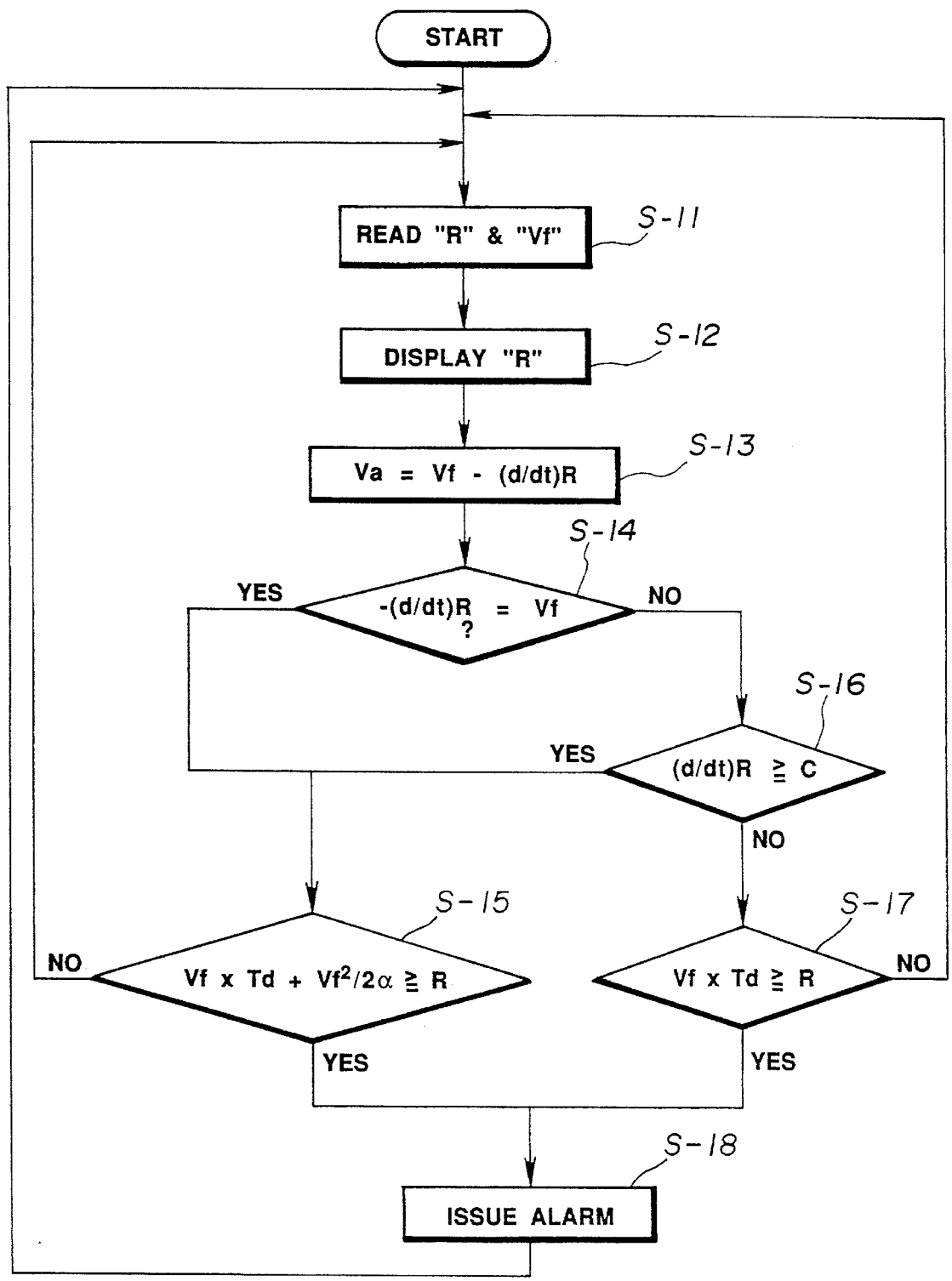
FIG. 7 is a flowchart showing programmed operation steps which are carried out in a control unit of the conventional collision warning system of FIG. 5.

As will be understood when comparing FIG. 1 and FIG. 5, the first embodiment is similar to the above-mentioned conventional collision warning system. Thus, only a part different from that of the conventional system will be described in the following. For facilitation, the same parts will be designated by the same numerals.

Figure 2:
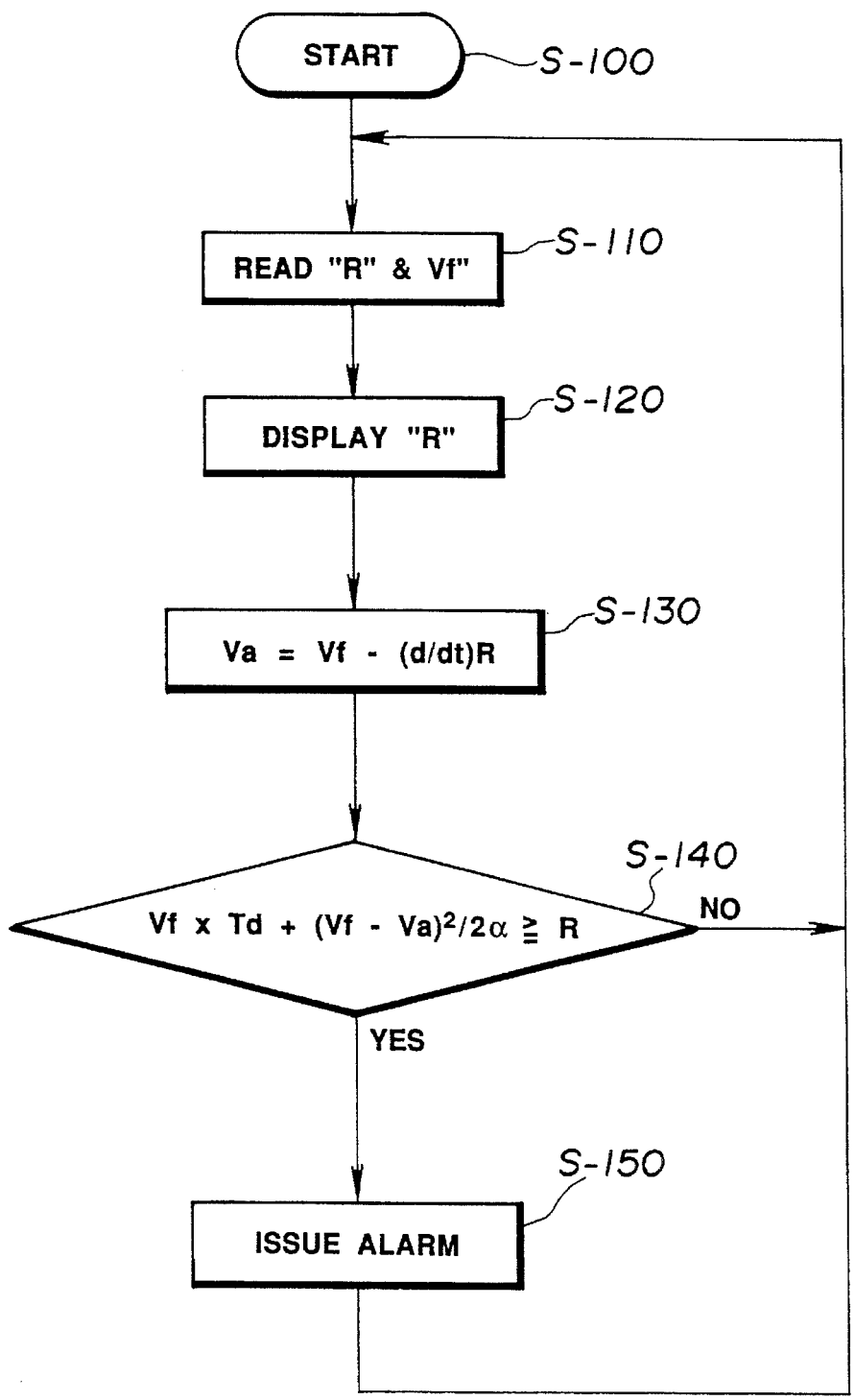
FIG. 2 is a flowchart showing programmed operation steps which are carried out in a control unit of the first embodiment.

In this first embodiment, the signal processing part 3 is different from that of the conventional system. That is, in the arithmetic circuit 41A, the following operation steps are carried out, which are depicted by a flowchart shown in FIG. 2.

Upon energization of the obstacle detection system, the operation steps start (step 100). Then, at step 110, the information signal representing the vehicle-to-obstacle distance "R" and the information signal representing the running speed "$V_f$" of the rear vehicle are read. This reading is carried out every given period.

At step 120, the signal representing the vehicle-to-obstacle distance "R" is converted to a display signal which is fed to the distance display device 51 (see FIG. 1). This device 51 displays the distance "R" thereon. Then, at step 130, the running speed "$V_a$" of the front vehicle is derived from the following equation.

$$V_a = V_f - (d/dt)R \tag{5}$$

wherein:

(d/dt) R: relative speed between rear and front vehicles.

Then, at step 140, a judgement is carried out as to whether the following equation is established or not.

$$V_f \times T_d + (V_f - V_a)^2 / 2\alpha \geq R \tag{6}$$

If YES, that is, if the measured distance "R" between the rear and front vehicles is equal to or smaller than the value "$V_f \times T_d + (V_f - V_a)^2 / 2\alpha$", the operation flow goes to step 150 judging actualization of possibility of the vehicle collision. At this step 150, an instruction signal is fed to the alarm issuing device 52 (see FIG. 1) to energize the same for letting the driver know the danger. Upon noticing the alarm, the driver can actuate the brake pedal for reducing the speed of the vehicle or stopping the same.

If NO at step 140, that is, if the measured distance "R" is larger than the value "$V_f \times T_d + (V_f - V_a)^2/2\alpha$", the operation flow goes back to step 110.

According to several experiments conducted by the inventor, it has revealed that usage of the equation (6) as means for judging the vehicle collision possibility brings about a desired result in which the emergency alarm is timely issued at the time when the driver really feels a danger.

Figure 3:
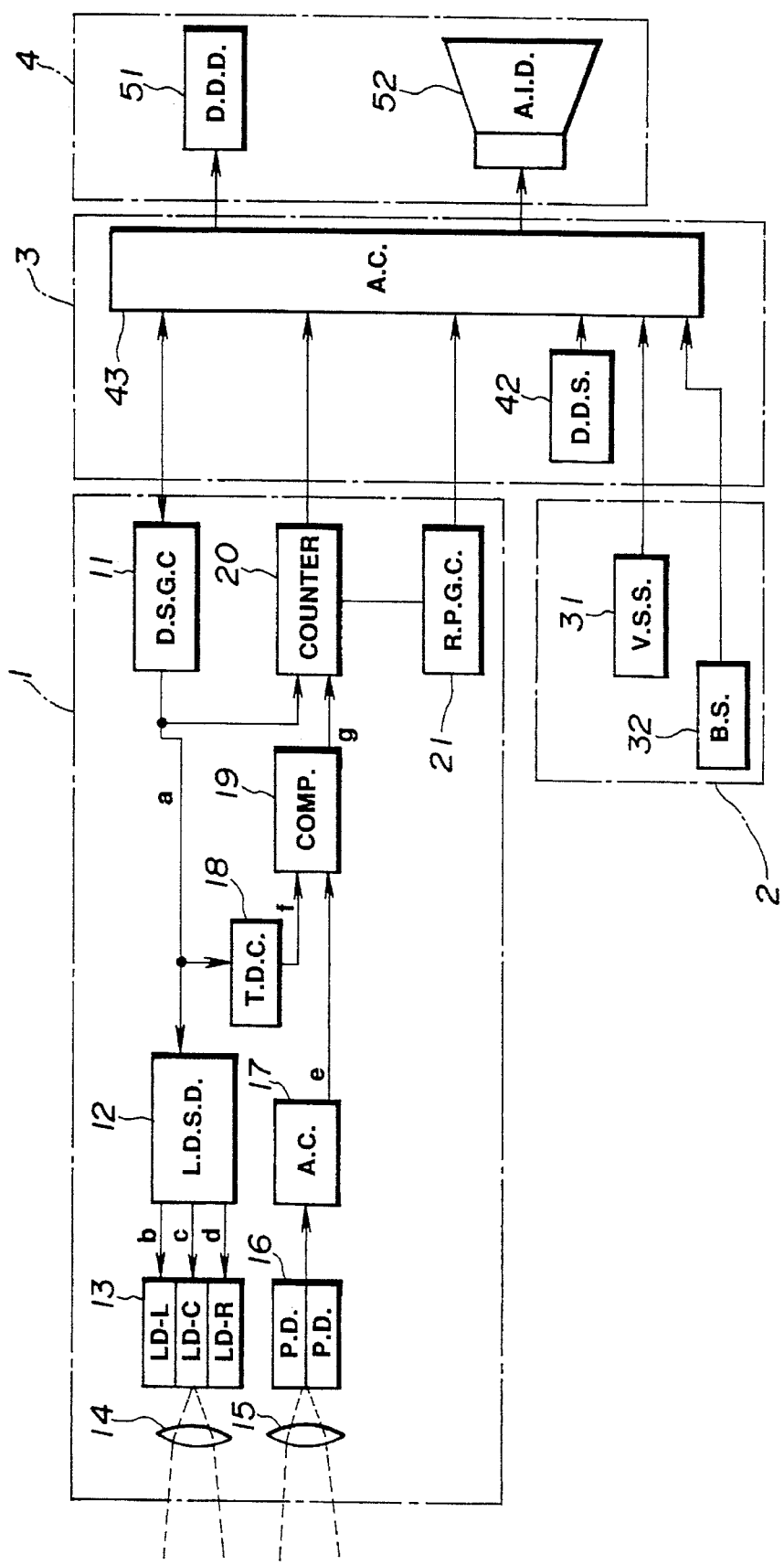
FIG. 3 is a view similar to FIG. 1, but showing a second embodiment of the present invention.

Referring to FIG. 3, there is shown a second embodiment of the present invention.

As will be understood when comparing FIG. 3 and FIG. 5, also the second embodiment is similar to the above-mentioned conventional system. Thus, only a part different part will be described in the following.

Figure 4:
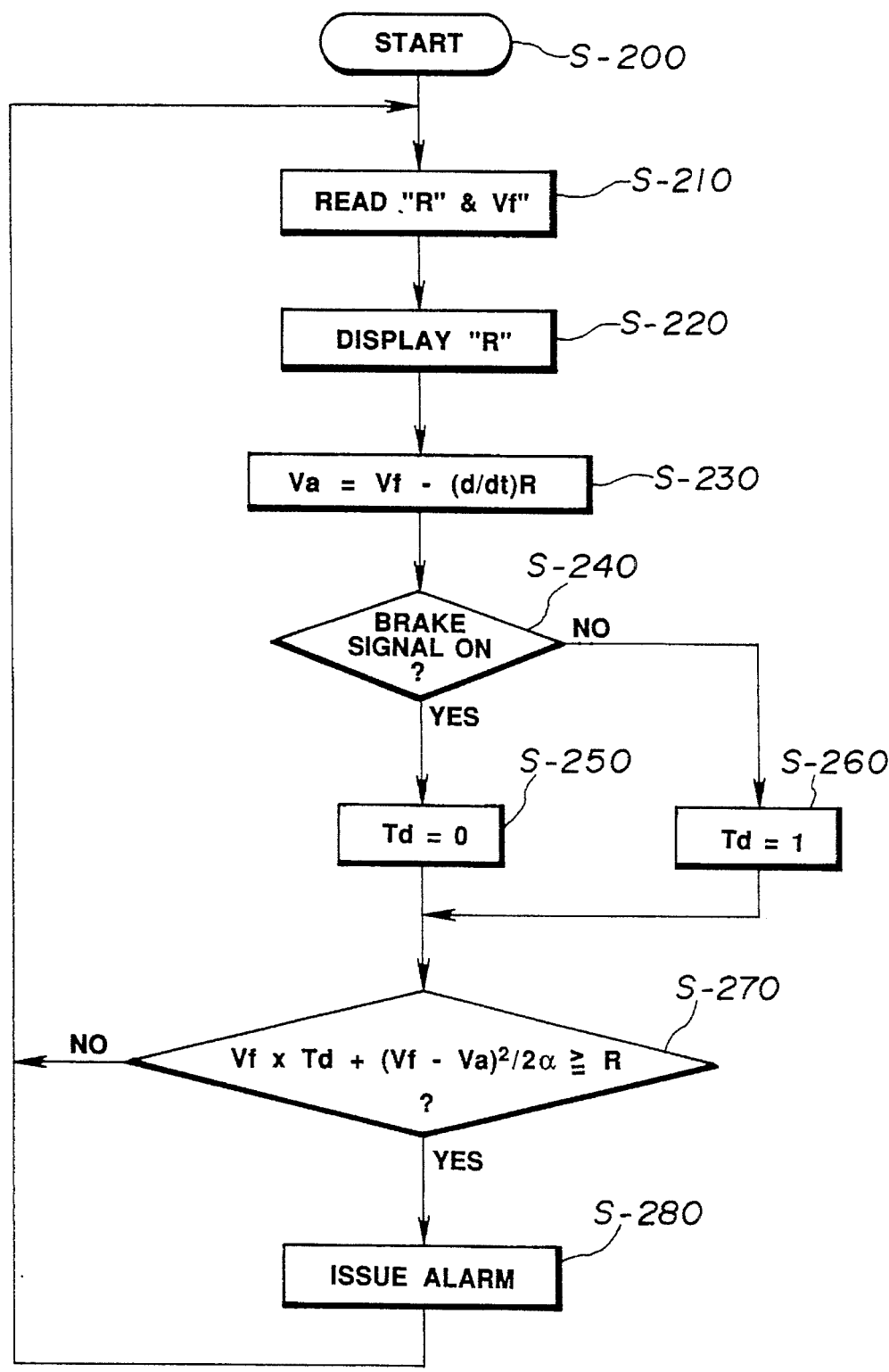
FIG. 4 is a flowchart showing programmed operation steps which are carried out in a control unit of the second embodiment.

In the second embodiment, a brake sensor 32 is employed which feeds the arithmetic circuit 43 with a brake representing signal when the brake pedal is depressed by a given angle. In the arithmetic circuit 43, the following operation steps are carried out which are depicted by a flowchart shown in FIG. 4.

Upon energization of the obstacle detection system, the operation steps start (step 200). Then, at step 210, the information signal representing the vehicle-to-obstacle distance "R" and the information signal representing the running speed "$V_f$" of the rear vehicle are read. This reading is carried out every given period.

At step 220, the signal representing the vehicle-to-obstacle distance "R" is converted to a display signal which is fed to the distance display device 51 (see FIG. 3). Then, at step 230, the running speed "Va" of the front vehicle is derived from the above-mentioned equation (5).

Then, at step 240, a judgement is carried out as to whether the brake pedal is depressed by the given angle or not. If YES, that is, when the brake pedal is depressed by the given angle, the operation flow goes to step 250 wherein the value of "Td" is set to 0 (zero), and at step 270, a judgement is carried out as to whether the equation (6) is established or not. Because the value "Td" has been set to 0 (zero), the judgement is so made whether the equation "$(V_f - V_a)^2/2\alpha \geq R$" is established or not. If YES, that is, when the measured distance "R" between the rear and front vehicles is equal to or smaller than the value "$(V_f - V_a)^2/2\alpha$", the operation flow goes to step 280 to issue the emergency alarm.

If NO at step 240, that is, when the brake pedal is not depressed by the given angle, the operation flow goes to step 260 wherein the value of "Td" is set to 1 (one), and then at step 270, a judgement is carried out as to whether the equation (6) is established or not. If YES, that is, when the measured distance "R" between the two vehicles is equal to or smaller than the value "$V_f \times T_d + (V_f - V_a)^2/2\alpha$", the operation flow goes to step 280 to issue the emergency alarm.

According to several experiments conducted by the inventor, it has revealed that much reliable alarm operation is obtained from the second embodiment.

It will be understood by those skilled in the art that the foregoing description is in terms of preferred embodiments of the present invention wherein various changes and modifications may be made without departing from the spirit and scope of the invention, as set forth in the appended claims.

What is claimed:

1. A collision warning system mounted on a vehicle to issue an alarm when the vehicle approaches near an obstacle, said system comprising:

means for detecting the speed (Vf) of the vehicle;

means for measuring the distance (R) between the vehicle and the obstacle;

means for deriving a speed (Va) of the obstacle using both said speed (Vf) and said distance (R);

means for determining whether the following relationship exists between the vehicle and the obstacle:

$$Vf \times Td + (Vf - Va)^2/2\alpha \geq R$$

wherein:
   Vf: said speed of the vehicle,
   Td: a time period,
   Va: said speed of the obstacle,
   α: a braking performance of the vehicle,
   R: said distance between the vehicle and the obstacle; and means for issuing an alarm to the driver when said relationship exists.

2. A collision warning system as claimed in claim 1, further comprising means for setting said time period (Td) to zero when a brake pedal of the vehicle is depressed a given amount.

3. A collision warning system as claimed in claim 1, wherein said means for detecting said speed (Vf) of the vehicle is a vehicle speed sensor mounted on the vehicle.

4. A collision warning system as claimed in claim 3, wherein said means for measuring said distance (R) comprises a laser beam emitting device mounted on the vehicle.

5. A collision warning system as claimed in claim 4, wherein said means for deriving uses the following equation for the derivation of said speed (Va) of the obstacle:

$$Va = Vf - dR/dt$$

wherein:
   Va: said speed of the obstacle,
   Vf: said speed of the vehicle,
   dR/dt: relative speed between the vehicle and the obstacle.

6. A collision warning system as claimed in claim 1, wherein said time period (Td) is the time period which elapses from the time when a driver notices the issuance of the alarm to the time the driver actuates the brake pedal.

7. A collision warning system mounted on a vehicle to issue an alarm when the vehicle approaches near an obstacle in front of the vehicle, said system comprising:

means for setting a time period (Td) which elapses from a time when a driver notices a danger to a time when the driver actuates a brake pedal of the vehicle;

means for detecting the speed (Vf) of the vehicle;

laser beam emitting means for measuring the distance (R) between the vehicle and the obstacle;

means for deriving the speed (Va) of the obstacle using the following equation:

$$Va = Vf - dR/dt$$

wherein:
   Va: said speed of the obstacle,
   Vf: said speed of the vehicle,
   dR/dt: relative speed between the vehicle and the obstacle, means for determining whether the following relationship exists between the vehicle and the obstacle:

$$Vf \times Td + (Vf - Va)^2/2\alpha \geq R$$

wherein:
- Vf: said speed of the vehicle,
- Td: said time period,
- Va: said speed of the obstacle,
- α: braking performance of the vehicle,
- R: said distance between the vehicle and the obstacle; and alarm means for giving an alarm to the driver when the relationship exists.

8. A collision warning system mounted on a vehicle to issue an alarm when the vehicle approaches near an obstacle in front of the vehicle, said system comprising:

first means for setting a time period (Td) which elapses from a time when a driver notices a danger to a time when the driver actuates a brake pedal of the vehicle;

second means for detecting the speed (Vf) of the vehicle;

third means for measuring a distance (R) between the vehicle and the obstacle;

fourth means for deriving the speed (Va) of the obstacle using the following equation:

$$Va = Vf - dR/dt$$

wherein:
- Va: said speed of the obstacle,
- Vf: said speed of the vehicle,
- dR/dt: relative speed between the vehicle and the obstacle, fifth means for determining whether the following relationship exists between the vehicle and the obstacle:

$$Vf \times Td + (Vf - Va)^2 / 2\alpha \geq R$$

wherein:
- Vf: said speed of the vehicle,
- Td: said time period,
- Va: said speed of the obstacle,
- α: braking performance of the vehicle,
- R: said distance between the vehicle and the obstacle;

sixth means for giving an alarm to the driver when said relationship exists; and seventh means for setting said time period (Td) to zero when the brake pedal has been depressed before said fifth means determines whether said relationship exists.

* * * * *